United States Patent [19]
Shimizu et al.
[11] 3,790,896
[45] Feb. 5, 1974

[54] AUTOMATIC GAIN CONTROL CIRCUIT

[75] Inventors: Kunio Shimizu, Tokyo; Isao Tamaki, Yokohama; Noriyuki Yamashita, Tokyo, all of Japan

[73] Assignee: Sony Corporation, Tokyo, Japan

[22] Filed: Jan. 5, 1973

[21] Appl. No.: 321,239

[30] Foreign Application Priority Data

Jan. 11, 1972 Japan .................. 47/5395
Aug. 7, 1972 Japan .................. 47/78889

[52] U.S. Cl. .................. 330/29, 307/264, 328/171, 328/175, 330/145, 330/141
[51] Int. Cl. .................. H03g 3/30, H03g 3/20
[58] Field of Search .... 307/237, 264; 328/150, 151, 328/168, 169, 171, 172, 173, 175; 330/29, 144, 145, 141

[56] References Cited

UNITED STATES PATENTS

| | | | |
|---|---|---|---|
| 3,206,689 | 9/1965 | Santana | 330/144 X |
| 3,230,458 | 1/1966 | Stangeland | 330/29 X |
| 3,449,684 | 6/1969 | Kagan | 330/29 |
| 3,560,768 | 2/1971 | Rimkus | 307/251 X |
| 3,581,223 | 5/1971 | Armstrong | 330/29 |
| 3,621,284 | 11/1971 | Cluett et al. | 328/171 X |
| 3,665,345 | 5/1972 | Dolby | 307/237 X |
| 3,716,801 | 2/1973 | Minner | 330/29 |
| 3,723,894 | 3/1973 | Benenati | 330/29 |
| 3,725,800 | 4/1973 | Papay | 330/29 |
| 3,737,678 | 6/1973 | Dolby et al. | 307/237 |

FOREIGN PATENTS OR APPLICATIONS

| | | | |
|---|---|---|---|
| 250,746 | 4/1960 | Australia | 330/29 |
| 1,803,655 | 6/1970 | Germany | 330/29 |

*Primary Examiner*—John S. Heyman
*Assistant Examiner*—L. N. Anagnos
*Attorney, Agent, or Firm*—Alvin Sinderbrand, Esq.; Lewis H. Eslinger, Esq.

[57] ABSTRACT

An automatic gain control circuit particularly desirable for use in a magnetic recording and/or reproducing apparatus includes a variable impedance element interposed in a signal shunt path to control the gain in accordance with the impedance of such element which is varied by a control signal from a plurality of capacitor charging circuits having different time constants and being supplied with the output of a rectifier for the received signal. The arrangement is such that the automatic gain control function is made dependent on the time duration of the received signal level, that is a short recovery time is provided for restoration of the original gain when an impulse or noise of short duration and high level is received, and a relatively long recovery time is otherwise provided for increasing the dynamic range of the output signal.

19 Claims, 12 Drawing Figures

AUTOMATIC GAIN CONTROL CIRCUIT

The present invention relates generally to an automatic gain control circuit, preferably for use in a magnetic recording and/or reproducing apparatus, and more particularly is directed to an improved automatic gain control circuit in which the gain control signal is controlled in accordance with the duration time of the input signal giving rise to such gain control signal.

In an apparatus for magnetically recording and/or reproducing human speech, music and so on, an automatic gain control circuit (referred to hereinafter as an AGC circuit) is usually employed in which the impedance of a variable impedance element, for example, provided in a shunt signal path, is controlled in response to a DC level obtained by rectifying the input signal for achieving a so-called gain control function. In the conventional AGC circuit, a capacitor is connected to the rectifier of the input signal in parallel with the control electrode of the variable impedance element to determine the response time required to attain a specified output level in the AGC circuit after the sudden arrival of an input signal, that is, the so-called attack time which is determined by the charging time constant of the capacitor; and further to determine the response time from sudden disappearance of the input signal to the return or restoration of the AGC circuit to its specified output level, that is, the so-called recovery time which is dependent on the discharging time constant of the capacitor. In such conventional AGC circuit of an apparatus for recording and/or reproducing music and the like the aforementioned capacitor is provided with a large capacity and the recovery time is set to be very long, for example approximately 30 to 60 seconds, so as to ensure high fidelity recording of the accentuation of sounds and to increase the dynamic range of the output signal without requiring changes in the recording level during recording. However, if the recording and/or reproducing apparatus provided with the desired conventional AGC circuit is employed for recording sounds which generally do not have large variations in amplitude or which have a small dynamic range, for example, human speech, and, during such recording, a sound of high level and short duration is received, for example, a high level click noise resulting from the impact of the microphone against a desk or other hard object, the gain is automatically reduced in correspondence to the high level of that noise. Although the received signal immediately returns to its usual or normal level at the conclusion of the high level noise of short duration, the gain continues to be reduced during the long recovery time of approximately 30 to 60 seconds with the result that, during such long recovery time, the sounds or signals being then received are recorded with an undesirably low level.

Accordingly, it is an object of this invention to provide an improved AGC circuit.

Another object is to provide an AGC circuit that is particularly desirable for use in a magnetic recording and/or reproducing apparatus.

A further object is to provide an AGC circuit, as aforesaid, in which the automatic gain control function is made dependent on the time duration of the received signal so that a short recovery time is provided for restoration of the original gain when an impulse or noise of a predetermined, relatively high level and of short duration is received, and a desirably long recovery time is otherwise provided for increased dynamic range of the output signal.

In accordance with an aspect of this invention, an AGC circuit particularly desirable for use in a magnetic recording and/or reproducing apparatus has a variable impedance element interposed in a signal control path to vary a transmission gain in accordance with the impedance of such element which is, in turn, varied by a control signal from a plurality of capacitor charging circuits having different time constants and being supplied with the output of a rectifier for the received signal, the arrangement being such that the automatic gain control function is made dependent on the time duration of the received signals.

The above, and other objects, features and advantages of the invention, will be apparent in the following detailed description of illustrative embodiments thereof which is to be read in connection with the accompanying drawings, wherein.

Figure 1:
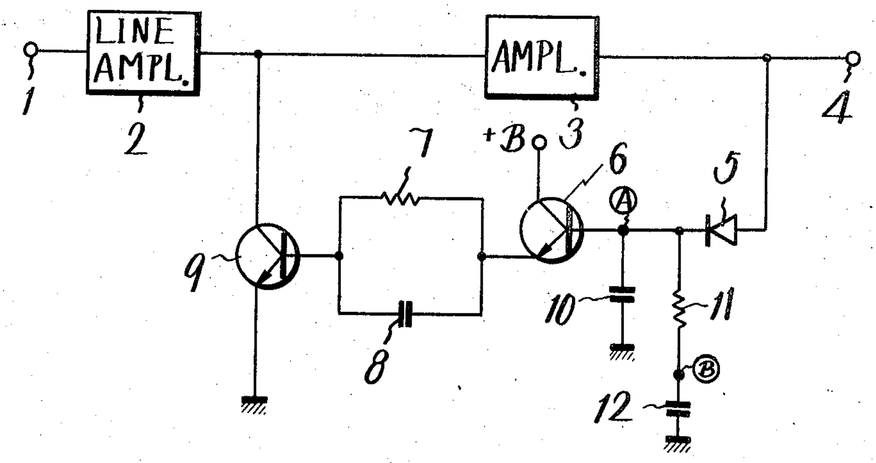
FIG. 1 is a circuit diagram illustrating an AGC circuit according to an embodiment of the present invention.

Referring to the drawings in detail and initially to FIG. 1 thereof, it will be seen that the AGC circuit according to this invention, as there illustrated, includes an input terminal 1 which is supplied with a signal to be recorded, for example, a signal representing human speech, music or the like. The input terminal 1 is connected to a transmission line which includes a line amplifier 2 and a second amplifier 3 and terminates in an output terminal 4. The output side of amplifier 3 is also connected to the anode of a diode 5 which constitutes a rectifier means. The cathode of diode 5 is connected to the base electrode of an npn-type transistor 6 which constitutes a current amplifier stage. The transistor 6 has its collector electrode connected to an electric power source terminal +B and its emitter electrode is connected through a parallel circuit of a transistor 7 and a capacitor 8 to the base electrode of a second npn-type transistor 9, which constitutes a variable impedance element.

It will be apparent that, with the circuit of FIG. 1 as described above, the gain in the signal being transmitted from input terminal 1 to output terminal 4 is determined by the proportion of the signal at the output side of line amplifier 2 that is shunted to ground through transistor 9. Thus, as the collector-emitter impedance of transistor 9 is reduced in response to an increased voltage applied to its base, an increased proportion of the signal from the output of amplifier 2 is shunted for correspondingly reducing the gain of the signal transmitted between input and output terminals 1 and 4. Further, it will be apparent that the voltage applied to the base of transistor 9 is determined by rectifier diode 5 and amplifier transistor 6 in correspondence with the level of the output signal supplied by amplifier 3 to output terminal 4 so that an increase in the level of the output signal causes a reduction in the gain. Thus, the circuit operates to maintain a substantially constant level of the output signal at terminal 4.

Further, in the automatic gain control circuit according to this invention illustrated by FIG. 1, a connection point A between the cathode of rectifier diode 5 and the base electrode of transistor 6 is grounded through a capacitor 10 and the connection between diode 5 and transistor 6 is also grounded through a series circuit of a resistor 11 and a capacitor 12. The capacity of capacitor 10 is selected to be relatively small, for example, 100 micro-farads, while that of the capacitor 12 is selected to be relatively large, for example 500 micro-farads, and the resistance value of resistor 11 is selected to be, for example, 1K ohms, which is very small with respect to the high input impedance of transistor 6 which may be, for example, several megohms.

The AGC circuit of FIG. 1 operates as follows: The capacitor 10 is charged quickly by the DC current from the rectifier diode 5 in accordance with the relatively small time constant determined by the capacitor 10 and the output impedance of amplifier 3, while the capacitor 12 is charged slowly or gradually in accordance with the large time constant determined by capacitor 12, resistor 11 and the output impedance of amplifier 3.

Figures 2, 3, 4, 5:
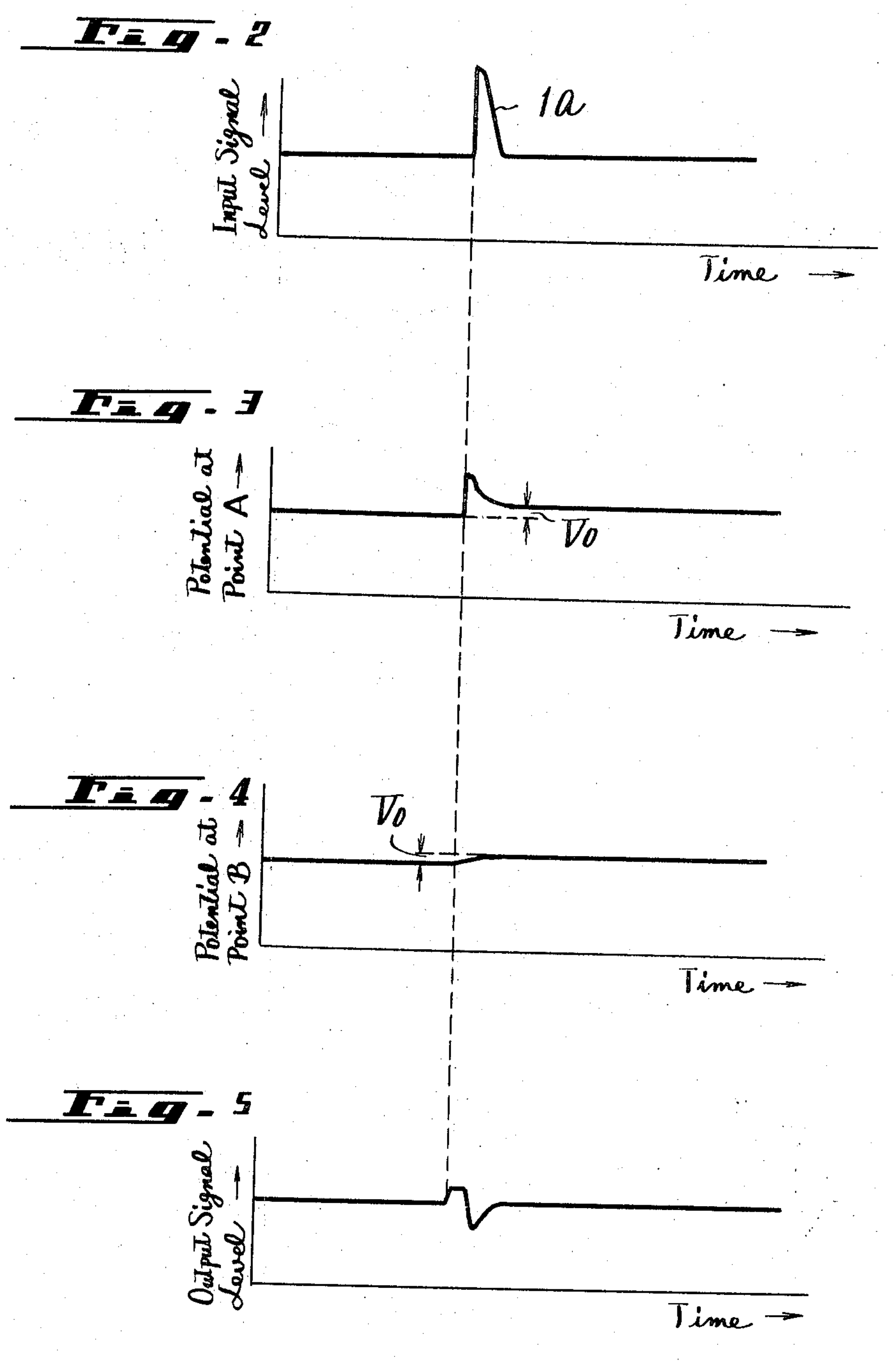
FIGS. 2–5 are waveform diagrams to which reference will be made in explaining the operation of the circuit illustrated in FIG. 1.

Thus, when a signal of short duration, as shown in FIG. 2, for example, a click noise 1*a* is supplied to the AGC circuit, the capacitor 10 is charged to a predetermined potential within a short time period to control the transistor 6 and, in turn, to control the impedance of transistor 9 constituting the variable impedance element. However, in this case, capacitor 12 is charged gradually, with the result that the potential at connection point A between diode 5 and capacitor 10 increases abruptly, as shown in FIG. 3, while the potential at the connection point B between resistor 11 and capacitor 12 increases gradually as shown in FIG. 4. Accordingly, when a signal of high level and short duration, such as the click noise 1*a* shown in FIG. 2, is applied to input terminal 1, the capacitor 10 is charged to the predetermined potential within the short duration of such signal during which the capacitor 12 is substantially maintained at its former potential. For this reason, the potential at point A becomes higher than that at point B with the result that, at the conclusion of the signal of high level and short duration, the electric charge stored on capacitor 10 is discharged through resistor 11 to capacitor 12 until the potentials at points A and B become equal to each other. Further, since the resistance of resistor 11 is much smaller than the input impedance of transistor 6, the potentials of the points A and B become equal within a short time period. Accordingly, when the click noise 1*a* shown in FIG. 2, or any other signal of large level and short duration, is applied to input terminal 1 of the AGC circuit according to the invention, the circuit soon returns to its former or normal state. In other words, the output signal obtained at output terminal 4 of the circuit returns to its normal recording level soon after the click noise 1*a* is applied, as shown in FIG. 5.

On the other hand, when a signal of large level and long duration is applied to input terminal 1 of the circuit of FIG. 1, the capacitors 10 and 12 are charged to their respective predetermined levels during such long duration, and the electric charges stored on capacitors 10 and 12 are only gradually discharged through the input impedance of transistor 6 upon the conclusion of the high level signal. Since the input impedance of transistor 6 is very high, for example, several megohms, due to the fact that the transistor 6 constitutes the current amplifier stage, the recovery time of the AGC circuit according to this invention is very long, for example, approximately 30 to 60 seconds, in the case of the reception of a signal of high level and long duration, with such long recovery time being determined mainly by the mentioned high input impedance of transistor 6. The capacitor 8 in parallel with resistor 7 serves to reduce distortion.

It will be apparent from the foregoing that, in the AGC circuit according to this invention, the recovery time of the gain control operation or function is automatically controlled in accordance with the duration of the input signal giving rise to such gain control operation. Thus, the AGC circuit according to the invention is particularly desirable for use in a magnetic recording and/or reproducing apparatus in connection with the recording of human speech, music or the like.

Figure 6:
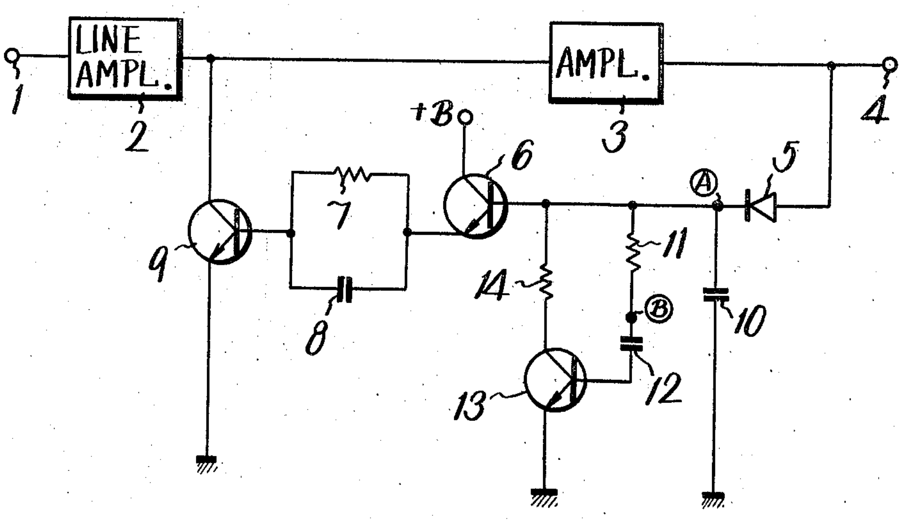
FIG. 6 is a circuit diagram illustrating another embodiment of the present invention.

A second embodiment of the present invention will be now described with reference to FIG. 6 in which elements corresponding to those described above with reference to FIG. 1 are identified by the same reference numerals. In the embodiment of FIG. 6, another npn-transistor 13 is provided in association with resistor 11 and capacitor 12. More specifically, as shown, the connection between the cathode of rectifier diode 5 and the base electrode of transistor 6 is connected through the series of circuit of resistor 11 and capacitor 12 to the base electrode of transistor 13 which has its collector electrode connected to such connection through a resistor 14 having a resistance smaller than that of the resistor 11, and the emitter electrode of transistor 13 is connected to ground.

With the AGC circuit shown in FIG. 6, when the click noise 1*a* of FIG. 2 is applied to input terminal 1, capacitor 10 is charged quickly to the predetermined potential, while capacitor 12 is not charged substantially during the duration of the click noise due to the fact that capacitor 12 has a large charging time constant, that is, the potential of capacitor 12 does not increase substantially during the short duration of click noise 1*a*. For this reason, the potential at point A becomes higher than that at point B with the result that the charge stored on capacitor 10 is discharged through resistor 11 to capacitor 12. At the same time, the charging current to capacitor 12 flows to the base of transistor 13 to make that transistor conductive, with the result that the charge stored on capacitor 10 is also discharged to ground through resistor 14 and the collector-emitter of transistor 13. Therefore, in the embodiment of FIG. 6, the potential at connection point A becomes equal to that at the connection point B within a relatively shorter time period than in the embodiment of FIG. 1, and hence the gain of the signal delivered to output terminal 4 is more quickly restored to its normal level after the click noise 1*a* is applied to input terminal 1 of the AGC circuit.

FIGS. 7 to 12 respectively show further embodiments of the present invention in which the attack times for the respective capacitor-charging circuits, the recovery time for an input signal of short duration and the recovery time for an input signal of long duration can be set independently of each other. In the embodiments of FIGS. 7 to 12, the elements which correspond to those described above with reference to FIG. 1 are again identified by the same reference numerals, and the independent setting of the attack times of the capacitor-charging circuits and of the recovery times for input signals of short and long durations is generally made possible either by providing a parallel circuit of a diode 15 and resistor 16 between the connection points A and B, as on FIGS. 7,8 and 9, or the diode 15 between the output side of amplifier 3 and connection point B in parallel with the diode 5 connected to connection point A, as on FIGS. 10,11 and 12.

Figure 7:
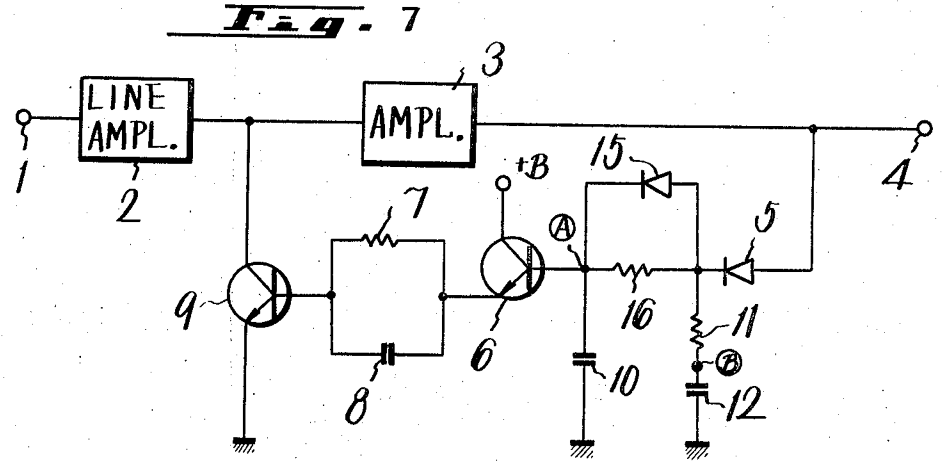
FIGS. 7–12 are circuit diagrams illustrating additional respective embodiments of the present invention in which the attack times and the recovery times of the automatic gain control circuits are determined independently of each other.

More specifically, in the embodiment of FIG. 7, the capacitor 10 is charged through the diodes 5 and 15 and its attack time or charging time constant is determined by the output impedance of amplifier 3 and the capacitor 10, as in the embodiments of FIGS. 1 and 6, while the capacitor 12 is charged through diode 5 and resistor 11 and its attack time or charging time constant is determined by the output impedance of amplifier 3, the value of resistor 11 and capacitor 12. When a signal of high level and short duration, such as, the click noise *1a* of FIG. 2, is receive, the potential at connection point A is higher than that at connection point B at the conclusion of such short duration signal, with the result that the charge stored on capacitor 10 is discharged through resistors 16 and 11, in series, to capacitor 12. Thus, the recovery time for a high level signal of short duration is determined by the values of resistors 11 and 16 and the values of capacitors 10 and 12. On the other hand, when a high level signal of long duration is received, the AGC circuit of FIG. 7 functions in the same way as has been described above with reference to FIG. 1, with the recovery time being determined mainly by the input impedance of transistor 6, and in part by the value of resistor 7. Thus, in the embodiment of FIG. 7, the attack time of capacitor 10 can be set by suitably selecting that capacitor and the output impedance of amplifier 3; the attack time of capacitor 12 can be set independently of the attack time of capacitor 10 by suitably selecting capacitor 12 and the value of resistor 11; the recovery time for a signal of short duration is set by suitably selecting the value of resistor 16; and the recovery time for a signal of long duration is set by suitably selecting the imput impedance of transistor 6 and the value of resistor 7.

Figure 8:
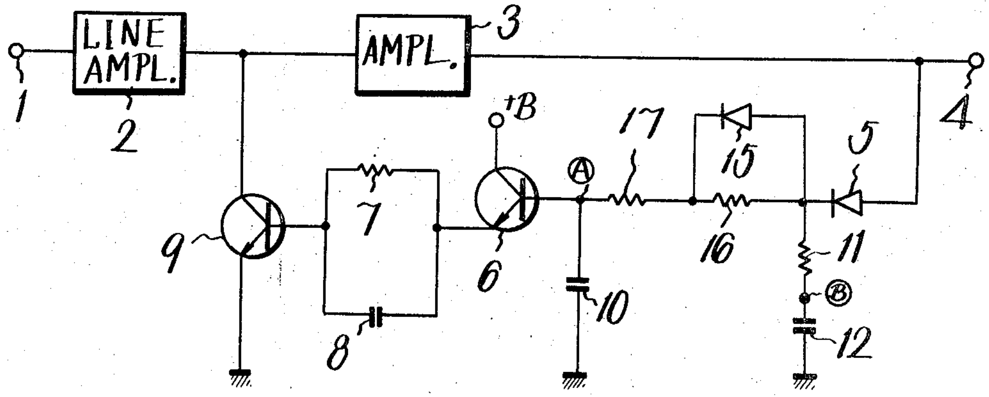

Referring now to FIG. 8, it will be seen that, in the embodiment there illustrated an additional resistor 17 is connected in series with the parallel circuit of diode 15 and resistor 16 between diode 5 and connection point A. Thus, the resistor 17 also enters into the determination of the attack time or charging time constant of capacitor 10. Accordingly, resistors 17 and 11 can be selected to independently set the charging time constants of capacitors 10 and 12, respectively, while resistor 16 and the input impedance of transistor 6 and resistor 7 can be selected to set the recovery times for signals of short and long durations, respectively, independently of each other and also independently of the charging time constants or attack times of capacitors 10 and 12. For example, the attack times of the capacitors 10 and 12 may be selected to be 20 milliseconds and about 2 to 3 seconds, respectively, while the recovery times for signals of the same level, but which are of short duration and long duration, can be selected to be as short as 1 second and as long as 60 seconds, respectively. It has been found that the embodiment of FIG. 8 will provide the foregoing AGC operating characteristics when the elements thereof influencing such characteristics are given the following values:

Output impedance of amplifier 3 — about 2k Ohms
Capacity of Capacitor 10 — 3.3 micro-farads
Capacity of Capacitor 12 — 10.0 micro-farads
Resistor 11 —33k ohms
Resistor 16 — 330k ohms
Resistor 17 — 3.9k ohms
Input impedance of transistor 6 — about 5M ohms
Resistor 7 — 10–20k ohms.

When the AGC circuit having the foregoing characteristic is incorporated in a magnetic recording and/or reproducing apparatus, music can be recorded with a wide dynamic range, and yet the sound of a cymbal, by way of example, can be recorded without excessive enhancement of its trailing note. Further, when recording human speech, for example the occurrence of a click noise or other relatively loud sound of short duration will not disturb the recording operation by reducing the gain for a protracted period, and recording at a substantially constant level will be achieved by reason of the attachment of the relatively long recovery time only in respect to automatic gain control signals which reflect changes in the input level of long duration.

Figure 10:
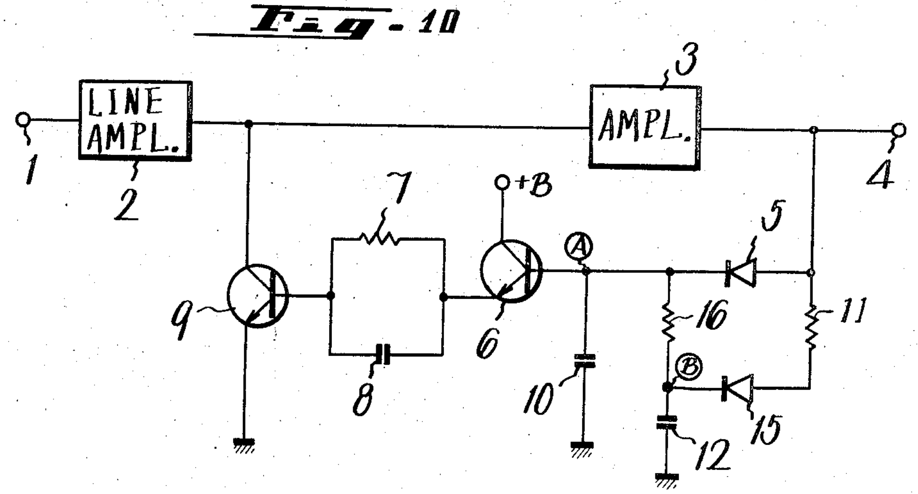

Referring now to FIG. 10, it will be apparent that the circuit there illustrated operates similarly to the AGC circuit described above with reference to FIG. 7. Thus, in the AGC circuit of FIG. 10, the attack time of capacitor 10, which is charged through diode 5, is determined by the output impedance of amplifier 3 and by selection of capacitor 10, while the attack time or large charging time constant of capacitor 12, which is charged through diode 15, is independently set by suitable selection of resistor 11 and capacitor 12. The recovery time for a signal of short duration is independently set by suitable selection of the resistor 16 through which capacitor 10 discharges to capacitor 12, and the recovery time for a signal of long duration is set by suitable selection of the input impedance of transistor 6 and the value of resistor 7.

Figure 11:
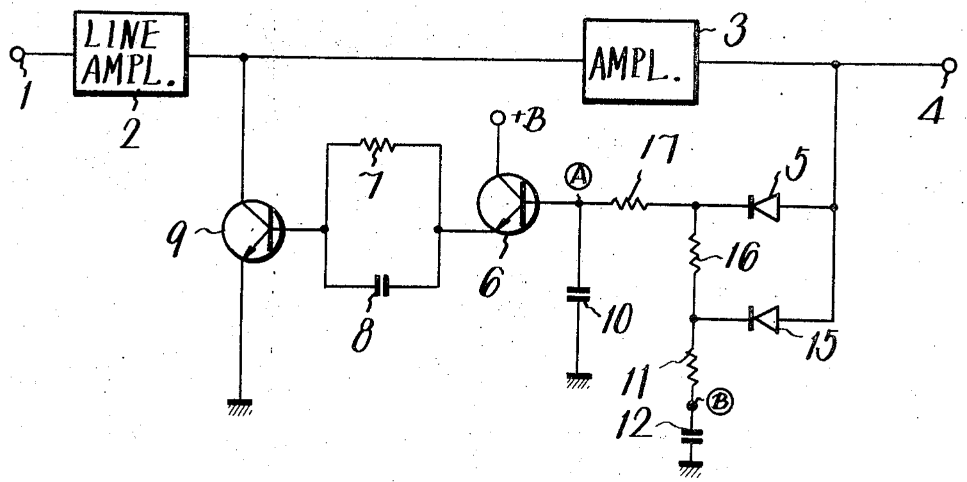

The AGC circuit of FIG. 11 is seen to be similar to that of FIG. 10, but additionally includes the resistor 17 connected between diode 5 and connection point A in the charging circuit for capacitor 10. In this case, as in the embodiment of FIG. 8, resistor 17 is selected to suitably set the charging time constant or attack time for the capacitor 10 and the resistors 16 and 17 jointly determine, along with resistor 11, the recovery time for a signal of short duration.

Figure 9:
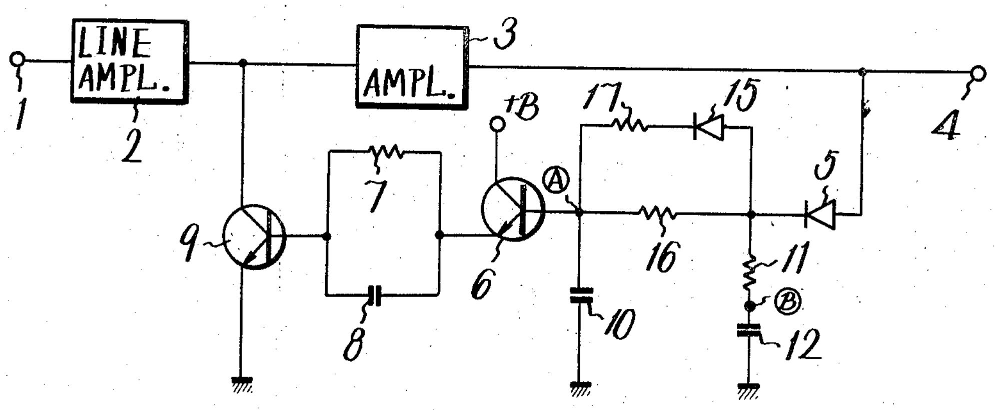
Figure 12:
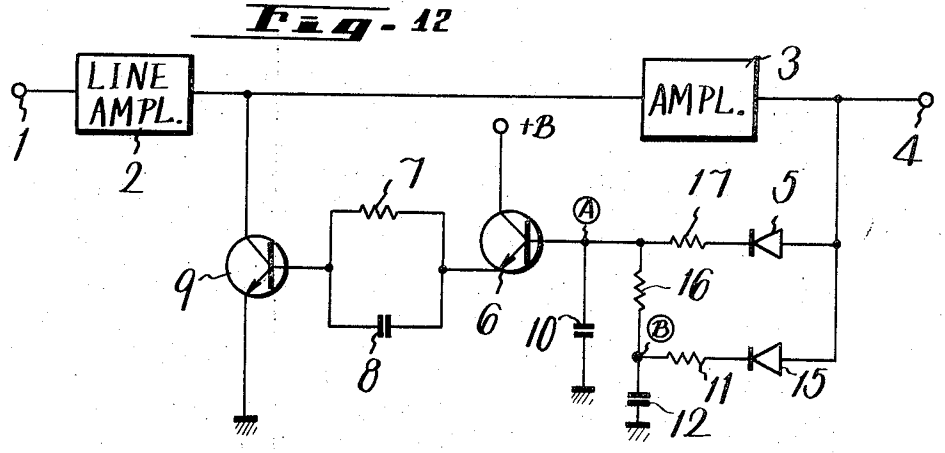

Finally, in the embodiment of FIG. 12, it will be seen that the resistors 11, 16 and 17 are disposed so that, as in the embodiment of FIG. 9, resistor 11 is selected to set the charging time constant or attack time of capacitor 12, resistor 17 is selected to set the attack time of capacitor 10 and resistor 16 is selected to set the recovery time for a signal of short duration, which resistor selection can be made independently of each other.

In the above described embodiments of the invention, particular capacitor-charging circuits having different attack times or charting time constants have been provided at the output side of the rectifier means constituted by the diode 5 or the diodes 5 and 15, and it should be apparent that capacitor-charging circuits other than those shown and described herein can be provided to achieve the required different attack times. Further, in each of the described embodiments, the variable impedance element constituted by transistor 9 is interposed in a shunt path for the signal. However, it will be apparent that such variable impedance element may be inserted in the signal transmission path between line amplifier 2 and amplifier 3 so as to increase the impedance in such path in accordance with an increase in the level of the signal rectified by rectifier 5 or 5 and 15.

Although specific embodiments of AGC circuits according to this invention have been described herein with reference to the accompanying drawings, it is to be understood that the invention is not limited to those precise embodiments, and that various changes and modifications may be effected therein by one skilled in the art without departing from the scope or spirit of the invention.

What is claimed is:

1. An automatic gain control circuit adapted to compensate for variation in the strength of a received signal and to quickly return to normal operation and when variation is of short duration, said automatic gain control circuit comprising:

means for rectifying said received signal, at least two capacitor-charging circuits having different time constants and being connected with the output of said rectifying means for producing a control signal responsive to said variations of the received signal, variable impedance means, means connecting said variable impedance means with the input of said rectifying means for controlling the proportion of said received signal being acted upon by said rectifying means in accordance with the impedance of said variable impedance means, and means connecting said variable impedance means with said capacitor-charging circuits for varying said impedance as a function of said control signal.

2. An automatic gain control circuit according to claim 1; in which one of said capacitor-charging circuits has a small time constant for charging a first capacitor of relatively small capacity and another of said capacitor-charging circuits has a large time constant for charging a second capacitor of relatively large capacity, said capacitor-charging circuits are connected to each other so that, when said variation of the received signal is of short duration to terminate before said second capacitor of said other capacitor-charging circuit is substantially charged, the charge on said first capacitor of said one capacitor-charging circuit is discharged, at least in part, to said second capacitor.

3. An automatic gain control circuit according to claim 2; further comprising means activated in response to the discharging of said first capacitor to said second capacitor for quickly completing the discharging of said first capacitor.

4. An automatic gain control circuit according to claim 3; in which said means for quickly completing the discharging of said first capacitor includes a transistor rendered conductive in response to said discharging of said first capacitor to said second capacitor.

5. An automatic gain control circuit according to claim 2; in which said means connecting said variable impedance means with said capacitor-charging circuits has a relatively large input impedance through which the charges on said first and second capacitors are relatively slowly discharged upon the termination of a variable in received signal strength which is of sufficient duration to achieve substantially complete charging of said first and second capacitors.

6. An automatic gain control circuit according to claim 2; in which said means for rectifying the received signal includes at least one diode.

7. An automatic gain control circuit according to claim 6; in which said one diode is connected to said one capacitor-charging circuit, said means for rectifying the received signal includes another diode, and said other diode is connected to said other capacitor-charging circuit.

8. An automatic gain control circuit according to claim 7; in which said other capacitor charging circuit includes a resistor connected between said other diode and said second capacitor for determining said large time constant for charging of said second capacitor, and a resistor is connected between said capacitor-charging circuits for determining the rate at which said charge on the first capacitor is discharged, at least in part, to said second capacitor.

9. An automatic gain control circuit according to claim 8; in which a resistor is connected between said one diode and said first capacitor for determining said small time constant for charging of said first capacitor.

10. An automatic gain control circuit according to claim 2; in which a parallel circuit of a unidirectional element and a resistor is connected between said rectifying means and said one capacitor-charging circuit with said unidirectional element conducting in the direction toward said first capacitor and said resistor determines the rate at which said charge on the first capacitor is discharged, at least in part, to said second capacitor when said variation of the received signal is of short duration.

11. An automatic gain control circuit according to claim 10; in which an additional resistor is connected between said unidirectional element and said first capacitor for determining said small time constant.

12. An automatic gain control circuit according to claim 11; in which said additional resistor is connected in series with said parallel circuit of the unidirectional element and the first mentioned resistor.

13. An automatic gain control circuit according to claim 11; in which said additional resistor is connected in series with said unidirectional element in said parallel circuit.

14. An automatic gain control circuit according to claim 1; in which said means connecting said variable impedance means with said capacitor-charging circuits includes an amplifier transistor receiving said control signal and having a relatively high input impedance so that when said variation of the received signal is of relatively long duration to complete the charging of said first and second capacitors within said relatively long duration, the charges on said capacitors are discharged to said transistor at a slow rate on termination of said variation.

15. An automatic gain control circuit comprising:

a transmission line for transmitting a signal from one end to the other end of said line, a signal shunt path connected with said transmission line and including variable impedance means for varying the preparation of said signal passing through said shunt path, and thereby controlling the gain of said signal, in accordance with the impedance of said variable impedance means, rectifying means connected with said transmission line for providing a rectified signal that varies with the strength of said signal being transmitted by said line, control means having a connection receiving said rectified signal from said rectifying means for varying the impedance of said variable impedance means as a function of the potential applied to said control means by said connection, first and second capacitor-charging circuits including first and second capacitors, respectively, and being connected with said connection between said rectifying means and said control means for the charging of said capacitors with said rectified signal, said first and second capacitor-charging circuits having relatively small and large time constants, respectively, for the charging of their respective capacitors so that, when the level of the signal received by said transmission line is increased for a short period during which said second capacitor is only incompletely charged by the corresponding rectified signal, said first capacitor discharges, at least in part, to said second capacitor for quickly restoring said potential applied to said control means to the value of said rectified signal then received from said rectifying means, and said control means having a relatively large input impedance through which said first and second capacitors discharge relatively slowly after said level of the received signal has been increased for a relatively long period during which both capacitors are fully charged, thereby to delay the return of said potential to the value of the rectified signal then received from said rectifying means.

16. An automatic gain control circuit according to claim 15; in which said variable impedance means includes a transistor having its base connected with said control means and its collector-emitter interposed in said signal shunt path for varying the impedance in said path as a function of the potential applied to said base.

17. An automatic gain control circuit comprising:

a transmission line for transmitting a signal from one end to the other end of said line, a line amplifier interposed in said transmission line, a first diode connected to said transmission line between said amplifier and said other end of the line, a first time constant circuit connected to the output side of said first diode, a parallel circuit of a second diode and a resistor also connected to said output side of said first diode, a second time constant circuit connected to said parallel circuit and having a time constant that is shorter than the time constant of said first time constant circuit, and a variable impedance element connected to said transmission line and having a control electrode connected with said second time constant circuit to control the impedance of said variable impedance element in response to the time duration of an input signal of a predetermined voltage supplied to said transmission line.

18. An automatic gain control circuit according to claim 17; in which a second resistor is connected in series with said parallel circuit.

19. An automatic gain control circuit comprising:

a transmission line for transmitting a signal from one end to the other end of said line, a line amplifier interposed in said transmission line, first and second diodes connected to said transmission line between said line amplifier and said other end of the line, a first time constant circuit connected to the output side of said first diode, a second time constant circuit connected to the output side of said second diode and having an attack time that is shorter than the attack time of said first time constant circuit, a resistance element connected between said first and second time constant circuits, and a variable impedance element connected to said transmission line and having a control electrode connected to said second time constant circuit to control the impedance of said variable impedance element in response to the terminal voltage of said second time constant circuit.

* * * * *